United States Patent [19]
Vermilion et al.

[11] Patent Number: 4,916,447
[45] Date of Patent: Apr. 10, 1990

[54] WARNING SYSTEM FOR AIRCRAFT LANDING WITH LANDING GEAR UP

[75] Inventors: Everette E. Vermilion, Seattle; Noel S. Paterson, Bothell, both of Wash.

[73] Assignee: Sundstrand Data Control, Inc., Redmond, Wash.

[21] Appl. No.: 494,594

[22] Filed: May 13, 1983

[51] Int. Cl.⁴ ............................................. G01C 21/00
[52] U.S. Cl. ...................................... 340/970; 340/963; 364/433
[58] Field of Search .................................. 340/959–960, 340/963–964, 967–968, 970, 973, 975, 977, 945, 969, 946; 364/427–430, 431.01, 433–434; 73/178 T, 178 H, 178 R, 117.4; 123/198 D; 342/65

[56] References Cited

U.S. PATENT DOCUMENTS

| | | |
|---|---|---|
| 3,691,356 | 9/1972 | Miller .................................. 364/427 |
| 3,988,713 | 10/1976 | Bateman ............................... 340/970 |
| 4,030,065 | 6/1977 | Bateman ............................... 340/970 |
| 4,121,194 | 10/1978 | Downey et al. ...................... 73/117.4 |
| 4,319,218 | 3/1982 | Bateman ............................... 340/970 |

Primary Examiner—Joseph A. Orsino
Assistant Examiner—Brent A. Swarthout
Attorney, Agent, or Firm—Mason, Kolehmainen, Rathburn & Wyss

[57] ABSTRACT

A system for providing a voice warning to the pilot of a fighter/attack aircraft when the aircraft is landing with the landing gear up monitors the radio altitude, airspeed and engine power of the aircraft and provides a predetermined voice warning if the landing gear is not down when the airspeed is less than a predetermined speed, for example, approximately 200 knots, the radio altitude is less than a predetermined altitude, for example, approximately 100 feet, and the engine is not developing take-off power.

10 Claims, 1 Drawing Sheet

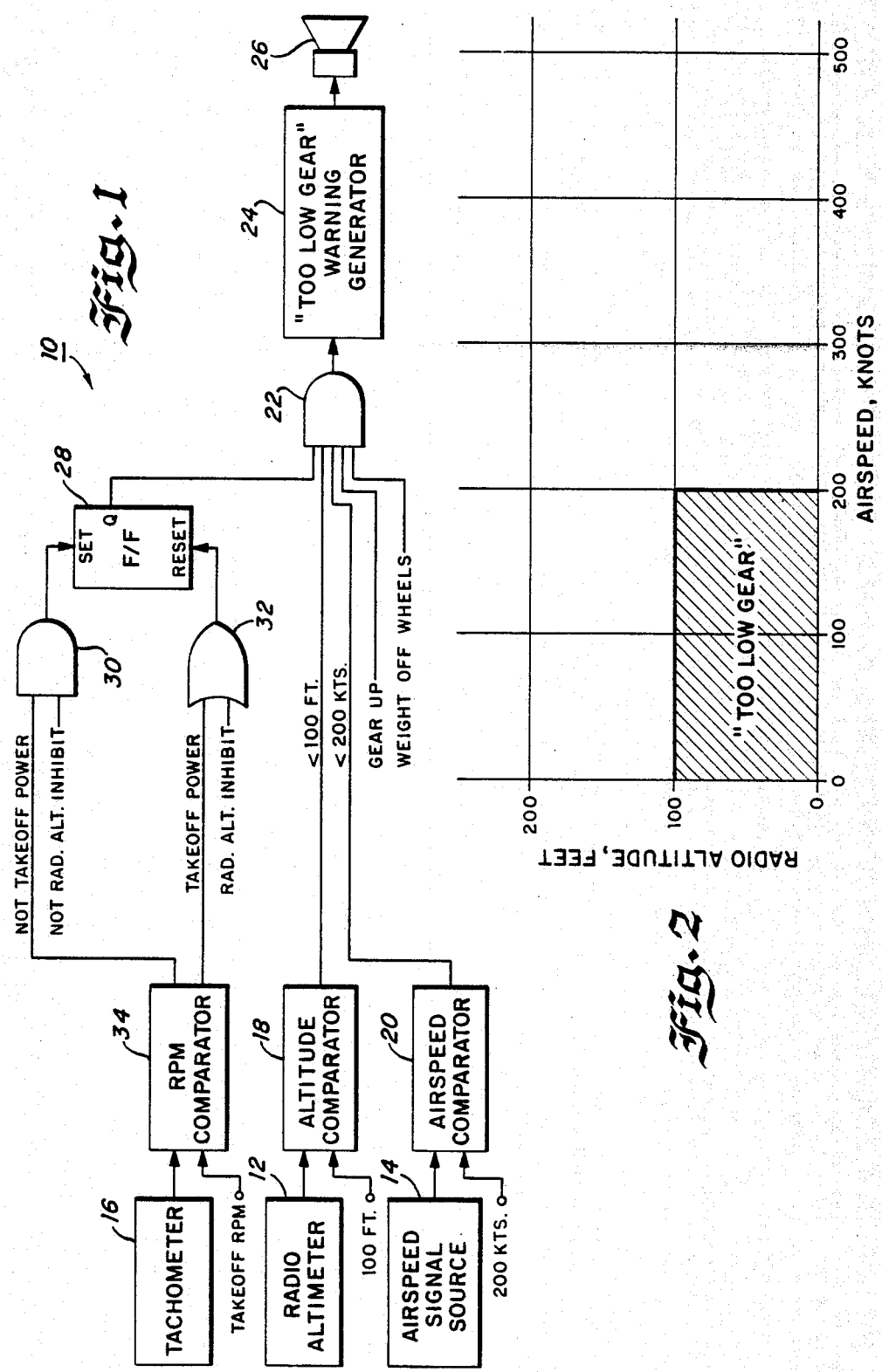

WARNING SYSTEM FOR AIRCRAFT LANDING WITH LANDING GEAR UP

BACKGROUND OF THE INVENTION

1. Field of the Invention

This invention relates generally to systems for providing warnings to the pilot of an aircraft when an unsafe flight profile exists, and more particularly for providing the pilot of an aircraft with a warning should the aircraft attempt to land with the landing gear up.

2. Description of the Prior Art

Systems for providing the pilot of an aircraft with a warning if he attempts to land with the landing gear up are known. These systems range from simple systems that sound a buzzer or the like when the altitude of the aircraft drops below a predetermined level to more sophisticated systems such as those disclosed in U.S. Pat. No. 4,030,065 that senses the altitude of the aircraft above ground and the positions of the flaps and the landing gear to provide a voice warning such as "TOO LOW GEAR" if the pilot should attempt to land with the landing gear up.

While these systems, particularly the more sophisticated systems described in the aforementioned patent, are suitable for use in transport and private aircraft, they are not entirely satisfactory for use in aircraft such as those that routinely engage in low altitude maneuvers, such as, military fighter/attack aircraft. The performance of low level maneuvers, such as those often performed as part of a tactical mission, can cause false warnings to be generated by warning systems designed for transport aircraft. Moreover, the landing profile of a high performance aircraft such as a military fighter/attack aircraft is different from that of a transport plane, thus different warning criteria than those used with transport aircraft are required.

SUMMARY OF THE INVENTION

Therefore, it is an object of the present invention to provide a warning system that overcomes many of the disadvantages of the prior art warning systems.

It is yet another object of the present invention to provide a system that provides a warning to the pilot of a fighter/attack aircraft in the event that he attempts to land with the landing gear up.

It is yet another object of the present invention to provide a warning system that warns the pilot of an aircraft if he attempts to land with the landing gear up, but generates virtually no false warnings during low altitude maneuvers.

Therefore, in accordance with a preferred embodiment of the invention, there is provided a system that monitors the altitude above ground and airspeed of the aircraft and generates a voice warning such as "TOO LOW GEAR" when the altitude of the aircraft is below a predetermined altitude, such as, for example, 100 feet and the airspeed of the aircraft is below a predetermined airspeed, such as, for example, 200 knots. The power being generated by the engine is also monitored to inhibit the warning when take-off power is being produced to avoid a false warning on a take-off and on a go-around after a missed approach.

DESCRIPTION OF THE DRAWING

These and other objects and advantages of the present invention will become readily apparent upon consideration of the following detailed description and attached drawing, wherein:

FIG. 1 is a logical block diagram of the warning system according to the invention; and FIG. 2 is a graph illustrating the relationship between the airspeed of the aircraft and the altitude above ground required to generate a warning.

DETAILED DESCRIPTION OF THE PREFERRED EMBODIMENT

Referring now to the drawing, with particular attention to FIG. 1, there is illustrated an embodiment of the warning system according to the invention generally designated by the reference numeral 10. The system 10 according to the invention is illustrated in FIG. 1 in logical block diagram form as a series of gates, comparators, flip-flops and the like for purposes of illustration; however, it should be understood that the actual implementation of the logic can be other than as shown in FIG. 1, with various digital and analog implementations being possible. The signals used by the warning system as described include radio altitude, airspeed, engine power or RPM along with a signal representative of the position of the aircraft landing gear and various validity signals. Depending on the type of aircraft in which the warning system is installed, the signals shown in FIG. 1 can be obtained from individual instruments such as a radio altimeter 12, an airspeed signal source 14 such as an air data computer or airspeed indicator and a tachometer 16, and various discrete circuit elements such as a switch indicating the position of the landing gear. Alternatively, these signals may be obtained from a digital data bus in certain newer aircraft.

As discussed, the system according to the invention provides a warning when the aircraft is operating below a predetermined speed and below a predetermined altitude when the landing gear is up. This function is provided by logic circuitry including the radio altimeter 12, the airspeed signal source 14 an altitude comparator 18, an airspeed comparator 20 and an AND gate 22 which controls the operation of a warning generator 24. A warning generator usable as the warning generator 24 is a digital voice warning generator such as the generator described in the above-mentioned U.S. Pat. No. 4,030,065 which may be used to generate a voice warning such as "TOO LOW GEAR", and apply it, either directly or indirectly, to a transducer such as a loudspeaker 26, or other suitable transducer. However, to avoid false warnings during a take-off or a go-around after a missed approach, the gate 22 is inhibited when take-off power is engaged. The inhibiting is accomplished by a set/reset flip-flop 28 that is controlled by an AND gate 30, an OR gate 32 and a comparator 34.

In operation, as the aircraft takes off, the power developed by the engine is monitored by the system 10. The engine power may be monitored, for example, by a switch indicating throttle position or, by means of the tachometer 16 which provides a signal representative of the engine RPM to the RPM comparator 34. When the RPM of the engine, for example, the RPM of the primary compressor of a jet engine, exceeds take-off RPM, for example, 90% of maximum engine RPM, the RPM comparator provides a take-off power signal to the OR gate 32. The OR gate 32 responds to the take-off power signal and resets the flip-flop 28 in order to inhibit the gate 22 to prevent a false warning from being generated during the take-off phase of flight.

Once the aircraft has taken off, and the RPM of the engine drops to a level below take-off RPM, the RPM comparator 34 provides a NOT TAKEOFF POWER signal to the AND gate 30 in order to set the flip-flop 28 and enable the AND gate 22. The NOT RADIO ALTITUDE INHIBIT signal applied to the AND gate 30, and the RADIO ALTITUDE INHIBIT signal applied to the gate 32 are validity signals that disable the system in the event of failure of the radio altimeter.

The radio altitude signal generated by the radio altimeter 12 is applied to the altitude comparator 18 and compared with a signal representative of a predetermined altitude, such as, for example, 100 feet, and if the radio altitude drops below the predetermined minimum altitude, the altitude comparator 18 provides an enabling signal to the AND gate 22. Similarly, the airspeed comparator 20 provides an enabling signal to the AND gate 22 when the indicated airspeed drops below a predetermined level such as, for example, 200 knots. Thus, the warning is enabled whenever the speed of the aircraft is below 200 knots and the altitude of the aircraft is below 100 feet above ground. Consequently, if the landing gear is not down under these conditions, the GEAR UP signal will be present as one input to the AND gate 22, and the warning will be generated. The WEIGHT OFF WHEELS signal is only used to disable the system when the aircraft is on the ground.

The warning boundary of the "TOO LOW GEAR" warning is illustrated in FIG. 2. As is apparent from the shaded area of FIG. 2, the warning will be generated whenever the airspeed of the aircraft drops below 200 knots, the radio altitude is less than 100 feet and the landing gear is not down. This envelope was determined after studying the operational characteristics of typical fighter/attack aircraft, such as the Fairchild A10. However, the envelope is typical of present day fighter/attack aircraft, and is generally independent of a particular type of aircraft. Because such aircraft typically fly and maneuver at low levels below 500 feet, the top of the warning envelope has been reduced to 100 feet to permit such maneuvers to occur without generating a warning. As a result, the warning envelope is substantially different from the warning envelope of a system designed for a transport aircraft, wherein the warning is typically generated whenever the aircraft drops below 500 feet. Because of the fast recovery characteristics of a fighter/attack aircraft the lowering of the top of the warning envelope to 100 feet does not cause a safety problem, because such aircraft can readily recover from altitudes of 100 feet and below.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A warning system for providing a warning to the pilot of an aircraft that is landing with its landing gear up comprising:
   means for providing a signal representative of the altitude of the aircraft above the ground;
   means for providing a signal representative of the power being developed by an engine of the aircraft;
   means for providing a signal representative of the position of the aircraft landing gear;
   means for determining whether the aircraft is in a landing or take-off phase of flight, wherein said phase of flight determining means includes means for comparing said engine power representative signal with a reference signal to provide a signal representative of take-off power, bistable means having first and second stable states, said bistable means being responsive to said take-off power representative signal and selectively operable to the first stable state when take-off power is not present and to the second stable state when take-off power is present;
   means responsive to the altitude signal providing means and the landing gear position signal providing means for generating a warning if the landing gear is not down and the aircraft is below a predetermined altitude above ground; and
   means responsive to said bistable means for inhibiting the generation of said warning when said bistable means is in its second stable state.

2. A warning system as recited in claim 1 wherein said predetermined altitude is approximately 100 feet.

3. A warning system as recited in claim 1 further including means for inhibiting the generation of said warning when the airspeed of the aircraft is above a predetermined airspeed.

4. A warning system as recited in claim 3 wherein said predetermined airspeed is approximately 200 knots, and said predetermined altitude is approximately 100 feet.

5. A warning system as recited in claim 1 wherein said engine power signal providing means includes a tachometer.

6. A warning system as recited in claim 1 wherein said warning generating means includes means for generating a voice warning.

7. A warning system as recited in claim 1 wherein said altitude signal providing means includes a radio altimeter.

8. A warning system as recited in claim 7 further including means for inhibiting the generation of a warning in the event of a failure of said radio altimeter.

9. A warning system as recited in claim 1 wherein sad bistable means includes a set-reset flip-flop.

10. A warning system as recited in claim 1 wherein said inhibiting means includes a gate.

* * * * *